United States Patent [19]

Perna

[11] Patent Number: 4,744,149

[45] Date of Patent: May 17, 1988

[54] MARKER HOLDING DEVICE FOR AN ICE SCRIBE

[76] Inventor: Nicolas A. Perna, 13976 New Braddock Rd., Centreville, Va. 22020

[21] Appl. No.: 27,460

[22] Filed: Mar. 18, 1987

[51] Int. Cl.$^4$ .......................... B43L 9/04; F16L 3/08

[52] U.S. Cl. .................................. 33/27.03; 248/74.1; 248/230

[58] Field of Search ....................... 248/69, 70, 72, 73, 248/74.1, 230; 33/27.03

[56] References Cited

U.S. PATENT DOCUMENTS

| | | | |
|---|---|---|---|
| 1,263,560 | 4/1918 | Kaufmann | 248/230 |
| 1,898,866 | 2/1933 | Bragger | 248/230 |
| 2,091,763 | 8/1937 | Macbeth | 248/230 |
| 2,466,717 | 4/1949 | Littell | 248/74.1 |
| 3,025,089 | 3/1962 | Ramsden | 248/230 |
| 3,385,545 | 5/1968 | Patton | 248/74.1 |

FOREIGN PATENT DOCUMENTS

| | | | |
|---|---|---|---|
| 23395 | 5/1930 | Australia | 248/230 |

*Primary Examiner*—Richard R. Stearns
*Attorney, Agent, or Firm*—Jones, Tullar & Cooper

[57] ABSTRACT

A marker holding device for attachment to the shaft of an ice scribe is disclosed. The device included two clamps, a first of which attaches to the shaft of the scribe, and a second of which holds the marker. The two clamps are pivotably attached to one another so that the marker may be positioned either downwardly for contact with the ice for marking the same, or upwardly away from the ice so that a conventional scribe tip on the end of the shaft can be used to scratch the ice. In a first embodiment, a pivot bolt connects the two clamps together, and is selectively loosened and tightened to allow adjustment of the marker position. A pair of stop pins are provided on one of the clamps to limit the rotation of the marker clamp relative to the scribe clamp so that the marker can be easily and quickly positioned in either the up or down position. In a modification of the first embodiment, a bullet catch is disposed in one of the clamps which cooperates with a pair of recesses in the other clamp to allow fixed positioning of the marker in the up or down position. Finally, in a second embodiment, two band type "C" clamps are employed which are connected back to back with a spring biased rotatable cam lock that permits two fixed positions between the clamps corresponding to the up and down positions of the marker.

1 Claim, 3 Drawing Sheets

FIG. 1
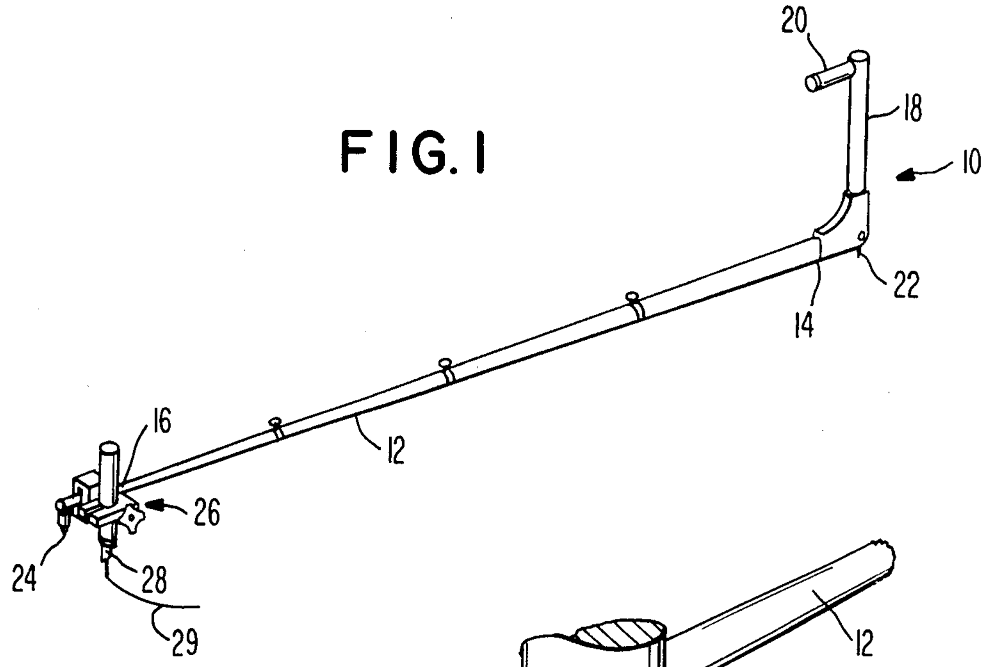
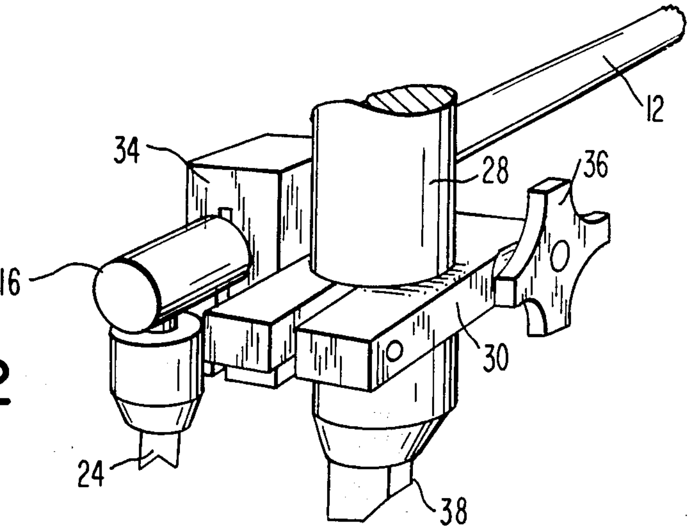
FIG. 2
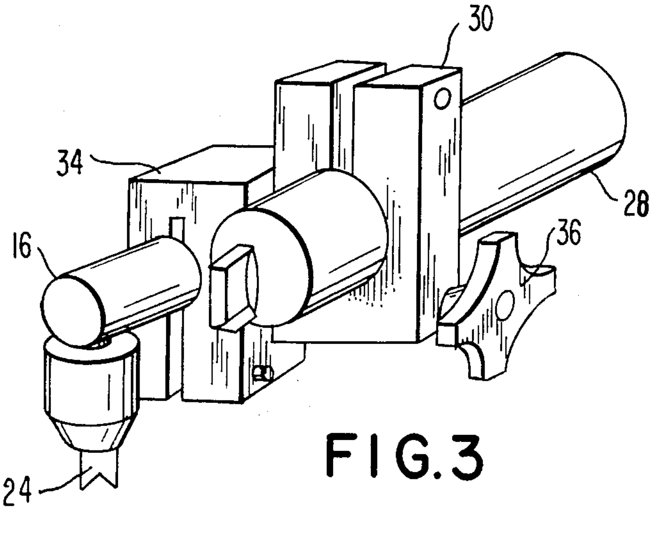
FIG. 3

FIG. 7
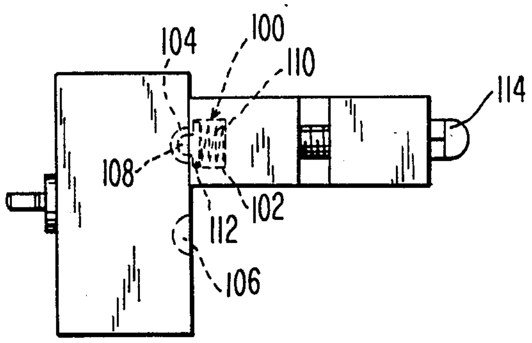
FIG. 8
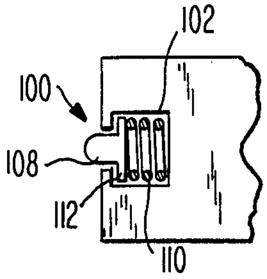
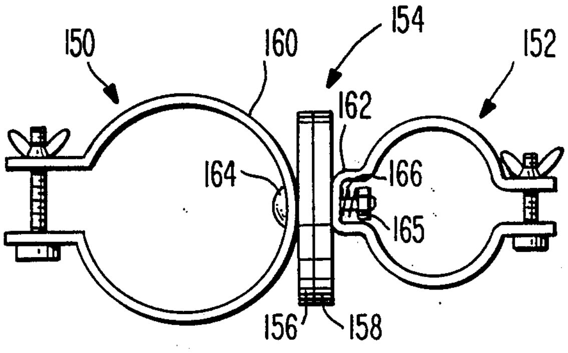
FIG. 9a
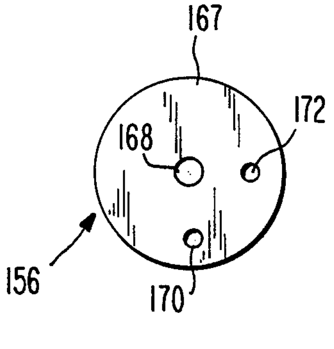
FIG. 9b
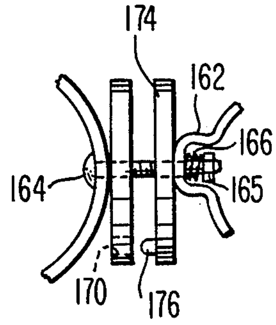
FIG. 9c

MARKER HOLDING DEVICE FOR AN ICE SCRIBE

FIELD OF THE INVENTION

The present invention relates generally to ice scribes for making figures on ice for aiding figure skaters, and more particularly, to a marker holding device for use with an ice scribe, which enables a figure to be made on the ice with either an ink marking pen, or a conventional scribe tip.

DESCRIPTION OF THE PRIOR ART

Mastery of the sport of figure skating involves mastering the four basic ice-skating blade edges. The mastery of these edges is reflected in the compulsory skating figures such as the circle 8, the waltz 8, the double 3, brackets, counters, rockers, loops, etc., and are basic for advanced skating such as free skating. It is incumbent then upon the person desiring to be proficient in figure skating to practice circles with the four basic edges. The figure 8 is the most important figure since mastering it involves the use of all four edges.

In order to facilitate the skater in laying out the circles to be followed on the ice, a device known as an "ice scribe" is used. This device consists of a series of telescoping poles with a tip at each end which extends down to the surface of the ice. The skater moves one end of the scribe around the other, fixed end, to scratch a circle on the ice, in much the same way as a compass is used to mark a circle on a piece of paper.

A drawback with these types of ice scribes, is that the mark that they carve in the ice, tends to be very difficult for a person to see. Thus in some instances, it would be desirable if a more visible mark could be made on the ice. This may be the case, for example, when using the scribe to teach small children how to figure skate.

An attempt was made in the past to employ an ink marker clamped to the end of the ice scribe's shaft to generate a more visible mark on the ice. This did not work very well, however, because the ink marker was not big enough or waterproof. In addition, the clamp held the marker in a fixed down position so that the conventional tip of the ice scribe could not be employed unless the marker and clamp were first removed from the end of the scribe shaft. This usually required tools, and was a waste of precious and expensive "patch" time.

Now that better ink markers are being manufactured that can be employed to generate wide visible marks on ice, the use of an ink marker with an ice scribe is feasible. However, it still would be desirable if a device could be devised, whereby an ink marker could be attached to the shaft of an ice scribe, and easily moved to a position which would allow the use of the conventional scribe tip. The present invention provides such a device.

SUMMARY OF THE INVENTION

It is therefore the object of the present invention to provide a marker holding device for use with an ice scribe, which enables a marker to be held in two positions; a first position where the marker will contact the ice, and a second position where the marker will be moved up and away from the ice so that a conventional scribe tip can contact the ice.

It is another object of the present invention to provide a marker holding device as described above wherein the marker can be easily and quickly moved from the first position to the second position without the use of any tools.

These, and other objects of the invention are achieved through the use of a pivoting holding device, which attaches to the end of an ice scribe shaft, and in one position, holds an ink-type marker in a position perpendicular to the scribe shaft, while in another position, holds the marker in a position parallel to the scribe shaft. In a first preferred embodiment, the holding device includes two aluminum clamping blocks that are pivotably connected to one another by means of a bolt or pin. The marker clamping block has an aperture in the center thereof for the reception of a marker housing, and a slot extends from one side of the aperture out to the edge of the block, thereby forming two open legs. Normally, the aperture is slightly smaller in diameter than the diameter of a marker body to be inserted in the same. This will insure that the marker will be held securely in the aperture without the use of clamping bolts or screws (thus reducing the overall weight of the holding device). To enable insertion of the marker in, or removal of the marker from, the aperture, a threaded jack hole is provided through one of the legs of the clamping block which, at one end, terminates at the slot between the legs, and faces the inside surface of the other leg. A thumb screw or bolt can then be screwed into the hole, and tightened until the end of the screw or bolt bears on the inside surface of the other leg, and pries the legs slightly apart. This causes the aperture to enlarge slightly, so that the marker can be easily inserted in, or removed from the aperture.

Similarly, the scribe clamping block has an aperture disposed in the center thereof, for reception of the shaft of an ice scribe, this aperture normally being slightly smaller in diameter than that of the ice scribe shaft. As with the first clamping block, a slot and threaded jack hole is also provided in the second clamping block for enabling a thumb screw to be used to release the clamping block from the scribe shaft. The two clamping blocks are pivotably connected together by means of a bolt or screw which passes through an aperture in the marker clamping block, and is threaded into an aperture in the scribe clamping block. A large round threaded knob is preferably provided on the end of the bolt or screw to adjust the tightening pressure between the two clamping blocks.

A pair of stop pins are provided on the scribe clamp which limit rotation of the marker clamp relative to the scribe clamp. In a first or down position, one of the stop pins holds the marker clamp so that the marker aperture is perpendicular to the scribe shaft aperture. In this position, the marker can contact the ice and make a mark on the same. In a second or up position, the second stop pin allows rotation of the marker clamp to a position wherein the marker aperture is parallel with the scribe shaft aperture. This position holds the marker up and away from the ice so that a conventional tip on the end of the scribe shaft can be employed to mark the ice. In addition, this position allows the entire scribe and mark holding device assembly to be stored in a conventional ice scribe storage case without removal of the holding device from the scribe.

In the operation of the device, an ink marker is slid into the aperture in the marker clamp, and the thumb screw is removed, thereby causing the clamping block to firmly grasp the marker. The holding device is then assembled to the ice scribe by sliding the scribe shaft through the aperture in the scribe clamp, and removing the same's thumb screw. Next, the marker is positioned up or down as desired, and the knob on the end of the pivot bolt is tightened to hold the marker clamp in place relative to the scribe clamp. To change the position of the marker, the knob is simply loosened, the marker clamp is rotated to the opposite position, and the knob is retightened.

In a modification of the preferred embodiment, the pivot bolt is not adjustable, and a spring biased bullet catch is provided in one of the clamping blocks, that cooperates with a pair of indentations in the other clamping block to secure the marker clamping block in the up or down position. This simplifies the operation of the device, and reduces the weight of the same as well. Now if it is desired to change the position of the marker, the marker clamp is forcibly rotated relative to the scribe clamp to overcome the spring force of the bullet catch in the first indentation, and the rotation is continued until the bullet catch springs into the second indentation, and fixes the marker clamp in the second position.

In a second embodiment of the present invention, a further simplified arrangement is employed wherein a pair of "C" type band clamps are utilized that are connected to one another with a pivoting cam lock. The cam lock includes two round flat plates, a first of which has its front side permanently affixed, by any suitable means such as by spot welding, to the back of the first "C" clamp, and the second of which has its front side permanently affixed to the back of the second "C" clamp. The backsides of each of the plates are held facing each other with a bolt and nut arrangement that passes through apertures disposed in the centers of the plates and the "C" clamps. A spring is provided on the bolt between the nut and the clamp adjacent the nut to bias the two plates into contact with one another.

A pin disposed on the backside of a first of the plates cooperates with a pair of indentations disposed in the backside of the second plate so that two fixed positions betwen the plates are obtained. In the first position, the clamps are held so that the scribe shaft and marker will be parallel to one another, while in the second position, the clamps are held so that the scribe shaft and marker will be perpendicular to one another (marker positioned for use). To change from one position to the other, the round plates are urged apart against the force of the biasing spring, and are rotated relative to one another until the pin on the first plate slips into the indentation on the second plate corresponding to the other position.

BRIEF DESCRIPTION OF THE DRAWINGS

The foregoing and additional objects, features and advantages of the present invention will become apparent from a consideration of the following detailed description of the preferred embodiment thereof taken in conjunction with the accompanying drawings in which:

FIG. 1 is a perspective view of an ice scribe having a first preferred embodiment of the invention disposed on the end thereof;

FIG. 2 is an enlarged perspective partial view of the end of an ice scribe showing the first preferred embodiment with a marker in the down, or marking position;

FIG. 3 is an enlarged perspective partial view of the end of an ice scribe showing the first preferred embodiment with a marker in the up, or nonmarking position;

FIG. 7 is a top view of a modification of the first preferred embodiment;

FIG. 8 is a top sectional view of the disassembled marker clamp that forms part of the modification of the preferred embodiment;

Figure 4:
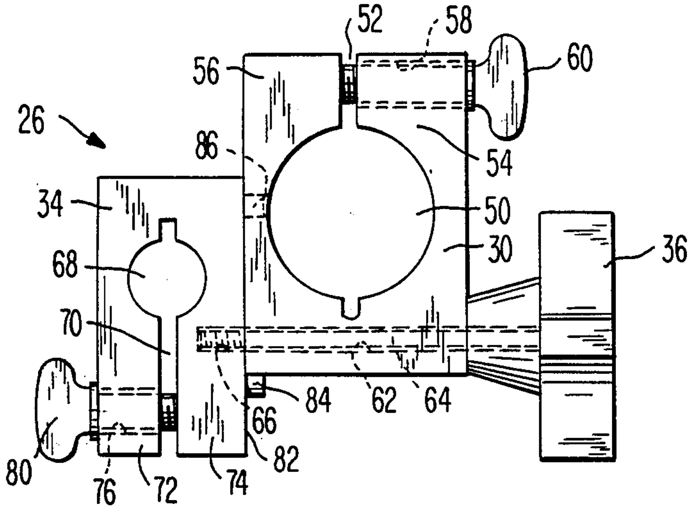
FIG. 4 is a front elevation of the first preferred embodiment of the invention in a marker up position.

FIG. *9a* is a front elevation of a second preferred embodiment of the invention;

FIG. *9b* is an end view of the back side of a round plate that forms a part of the second preferred embodiment; and, FIG. *9c* is a partial front view of the second preferred embodiment of the invention.

DETAILED DESCRIPTION OF THE PREFERRED EMBODIMENTS

Turning now to FIG. 1, there is shown generally at 10, an ice scribe having a telescoping shaft 12, with a first end 14, and a second end 16. A rod 18 having a handle 20 attached thereto extends vertically from first end 14, and a center scribe tip 22 depends from the bottom of first end 14. Disposed at second end 16, is an outer scribe tip 24, and a marker holding device 26, which forms a first embodiment of the present invention, and is shown holding a marker 28.

In the use of scribe 10, first end 14 is fixed in position on the ice with center scribe tip 22, and shaft 12 is rotated about the axis defined by rod 18 so that either outer scribe tip 24 can scribe a circular scratch in the ice, or if it is in the down position as shown, marker 28 can draw a mark 29 on the ice.

FIG. 2 is an enlargement of the second end 16 of the ice scribe, and provides a closer view of marker holding device 26. Specifically, there is shown in FIG. 2, a marker clamping block 30, preferably formed of aluminum, for holding marker 28. A similar scribe clamping block 34, also preferably formed of aluminum, is shown clamped in position around shaft 12, and is pivotably attached by means of a pivot bolt (not shown) to marker clamping block 30. Disposed on the end of the pivot bolt is an operating knob 36 for tightening and loosening the clamping blocks relative to one another.

In the position shown in FIG. 2, marking holding device 26 supports marker 28 vertically so that the tip 38 of marker 28 will extend further below shaft 12 than will outer scribe tip 24. This permits marker 28 to make a mark as the scribe 10 is moved across the ice, and holds outer scribe tip 24 up and away from the surface of the ice.

Turning now to FIG. 3, marker holding device 26 is shown in a horizontal position wherein tip 38 of marker 28 will not contact the ice, so that outer scribe tip 24 can be utilized to make a scratch in the ice. Marker 28 is moved from the vertical to the horizontal position by loosening the knob 36, rotating marker clamping block 30 clockwise 90 degrees relative to scribe clamping block 34, and retightening knob 36.

Figure 5:
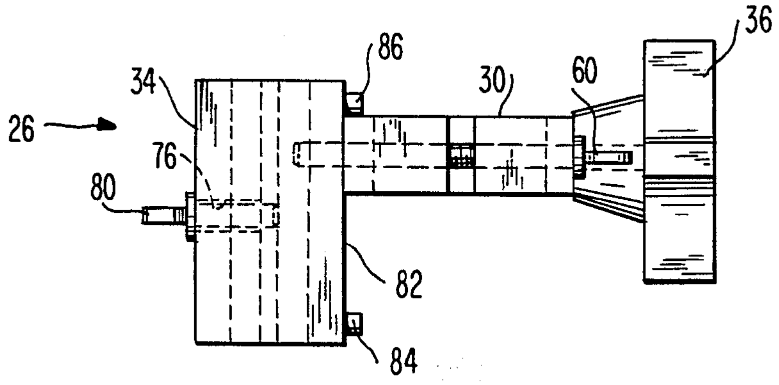
FIG. 5 is a top view of the first preferred embodiment of the invention in a marker up position.
Figure 6:
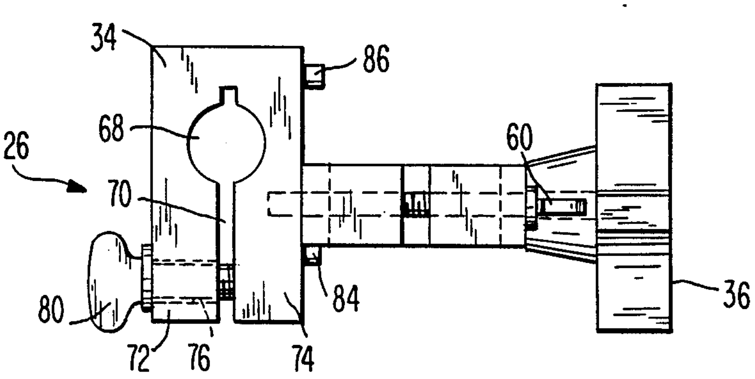
FIG. 6 is a front elevation of the first preferred embodiment of the invention in a marker down position.

The details of marker holding device 26 are illustrated in FIGS. 4–6. Specifically, in FIG. 4 there is shown a front view of marker holding device 26 with marker clamping block 30 in the up position. Clamping block 30 includes a centrally disposed aperture 50 for reception of the body of a marker. Normally, the diameter of aperture 50 is slightly smaller than the diameter of the marker to be held by clamping block 30. A slot 52 is formed in the body of block 30, and extends from the top of aperture 50 to the edge of block 30, thereby forming a pair of leg portions 54 and 56 on block 30. A threaded aperture 58 (shown in phantom) passes through leg portion 54 and receives a thumb screw 60 for spreading leg portions 54 and 56 apart, and thereby enabling a marker to be easily inserted in, or removed from, aperture 50. Once a marker is positioned in aperture 50, thumb screw 60 can be removed, and the marker will be securely held in place by the natural resilience of the aluminum clamping block.

Also disposed in marker clamping block 30, is an aperture 62 (shown in phantom), which passes all the way through the block 30 for reception of a pivot bolt 64 (also shown in phantom) that has knob 36 threaded onto a first threaded end. A threaded aperture 66 (also shown in phantom) is formed part way into scribe clamping block 34, and receives a second threaded end of pivot bolt 64 after it is passed through aperture 62. In this way, when knob 36 is tightened, the two clamping blocks 30 and 34, will be fixed in position relative to one another.

Like marker clamping block 30, scribe clamping block 34 also includes: a centrally disposed aperture 68 for reception of an ice scribe shaft, this aperture having a diameter that is normally slightly smaller than the diameter of an ice scribe shaft; a slot 70 extending from the bottom of aperture 68 to the edge of block 34, and forming a pair of leg portions 72 and 74; a threaded aperture 76 (shown in phantom) disposed in leg portion 72; and a thumb screw 80 for insertion in aperture 76 which is used to release clamping block 34 from a scribe shaft.

Protruding from an inner wall 82 of clamping block 34 that faces clamping block 30, are a pair of stop pins 84 and 86, which limit the rotation of block 30 relative to block 32. Specifically, lower stop pin 84 limits the downward rotation of block 30 as best seen in FIG. 6, while upper stop pin 86 limits the upward rotation of block 30 as best seen in FIG. 5.

Turning now to FIG. 6, there is shown the marker holding device 26 with marker clamping block 30 in the down position, as it would be when the marker is being used to mark the ice. As shown, clamping block 30 has been rotated about pivot bolt 64 counterclockwise 90 degrees from the vertical position shown in FIG. 4, and rests on lower stop pin 84.

Turning now to FIGS. 7 and 8, there is shown a modification of marker holding device 26, wherein the stop pins have been replaced by a bullet catch 100 that is shown in phantom. This bullet catch is shown disposed in a recess 102, in marking clamping block 30, and cooperates with a pair of recesses 104 and 106 (also shown in phantom), disposed in scribe clamping block 34, to selectively lock the two clamping blocks in one of two different positions relative to one another. As best illustrated in FIG. 8, bullet catch 100 includes a domed or bullet shaped catch member 108, and a spring 110, for biasing the catch member outwardly from recess 102. To prevent the catch member from falling out of recess 102, it includes shoulder portion, 112.

When marker clamping block 30 is rotated to its vertical position (marker up), bullet catch 100 is secured in recess 104, thereby locking block 30 with respect to block 34. To rotate block 30 to its horizontal position (marker down), pressure is applied to block 30 to overcome the resistance of spring 110, and block 30 is rotated until bullet catch 100 latches in recess 106. This simplified arrangement eliminates the need to loosen and retighten the knob on the end of the pivot bolt, and thus, the knob is not needed. Thus, as shown, a conventional bolt and washer pair 114 can be employed as the pivot bolt.

It should be understood that it would be a simple matter to reverse the arrangement set forth in FIGS. 7 and 8 so that the bullet catch would be disposed in scribe clamping block 34, and the cooperating recesses would be disposed in marker clamping block 30.

In yet another embodiment of the invention shown in FIGS. 9*a*–9*c*, a pair of conventional band type "C" clamps 150 and 152 are employed as the marker clamp, and scribe clamp respectively. These clamps are shown connected back to back to one another by means of a pivoting cam lock 154. This cam lock includes a pair of round flat plates, 156 and 158. Plate 156 is permanently affixed by any suitable means, such as by spot welding, to a center back portion 160 of clamp 150, while plate 158 is permanently affixed to a center back portion 162 of clamp 152. A bolt 164 passes through apertures in clamps 150 and 152, and plates 156 and 158, to secure the back sides of the two plates in an abutting relationship. A lock nut 165 is threaded on the end of bolt 164, and a biasing spring 166 is disposed on the shaft of bolt 164 between nut 165 and clamp 152 for urging plates 156 and 158 together.

Details of cam lock 154 are shown in FIGS. 9*b*–9*c*. FIG. 9*b* shows the back side 167 of plate 156 having a central aperture 168 for passage of bolt 164, and a pair of off center apertures 170 and 172. As shown in FIG. 9*c*, plate 158 includes a back side 174 having an off center catch pin 176 protruding therefrom. This catch pin cooperates with apertures 170 and 172, so that two fixed postions are available between clamps 150 and 152, one 90 degrees from the other. To reposition plate 156 relative to plate 158, they are pulled apart against the force of spring 166 as shown in FIG. 9*c*, and rotated 90 degrees relative to each other so that catch pin 176 can be inserted into the other of apertures 170 and 172 in plate 156.

Although the invention has been illustrated in terms of a number of preferred embodiments, it will be understood that other numerous variations and modifications can be made by those of skill in the art without departing from the true spirit and scope of the inventive concept as set forth in the following claims. It is clear that a variety of different types of clamping elements can be employed with the invention, the only requirement being that the clamps be adjustable with respect to each other to at least two different positions, a first position in which the ink marker will be held up and away from contact with the ice, and a second position in which the marker is held down for contact with the ice.

I claim:

1. A clamping device which adjustably positions a first member relative to a second member comprising:

a first metal clamping block having an aperture therein for reception of a first member, said aperture normally having a diameter that is slightly smaller than the diameter of a first member to be inserted into said aperture, and said first metal clamping block including means to temporarily enlarge said aperture so that a first member can be easily inserted into, or removed from said aperture;

a second metal clamping block pivotably attached to said first metal clamping block for securing the clamping device to a second member, said second metal clamping block having an aperture disposed therein for reception of a second member and normally having a diameter that is slightly smaller than the diameter of a second member, and means to temporarily enlarge said aperture in said second metal clamping block so that a second member can be easily inserted into, or removed from, the aperture; and, means to fix the position of said first metal clamping block relative to said second metal clamping block in at least a first and a second position.

* * * * *